No. 787,755. PATENTED APR. 18, 1905.
M. D. HELFRICH.
WATER CLOSET BOWL.
APPLICATION FILED NOV. 15, 1904.

WITNESSES:
Jos. A. Ryan
Perry B. Turpin

INVENTOR
Michael D. Helfrich
BY Munn & Co.
ATTORNEYS

No. 787,755.

Patented April 18, 1905.

UNITED STATES PATENT OFFICE.

MICHAEL D. HELFRICH, OF EVANSVILLE, INDIANA.

WATER-CLOSET BOWL.

SPECIFICATION forming part of Letters Patent No. 787,755, dated April 18, 1905.

Application filed November 15, 1904. Serial No. 232,837.

*To all whom it may concern:*

Be it known that I, MICHAEL D. HELFRICH, a citizen of the United States, residing at Evansville, in the county of Vanderburg and State of Indiana, have invented a new and useful Improvement in Water-Closet Bowls, of which the following is a specification.

My invention is an improvement in water-closet bowls, and particularly in the siphon-jet style of bowls; and the invention has for an object to provide a novel construction of jet-pipe; and it consists in certain novel constructions and combinations of parts, as will be hereinafter described and claimed.

Figure 1:
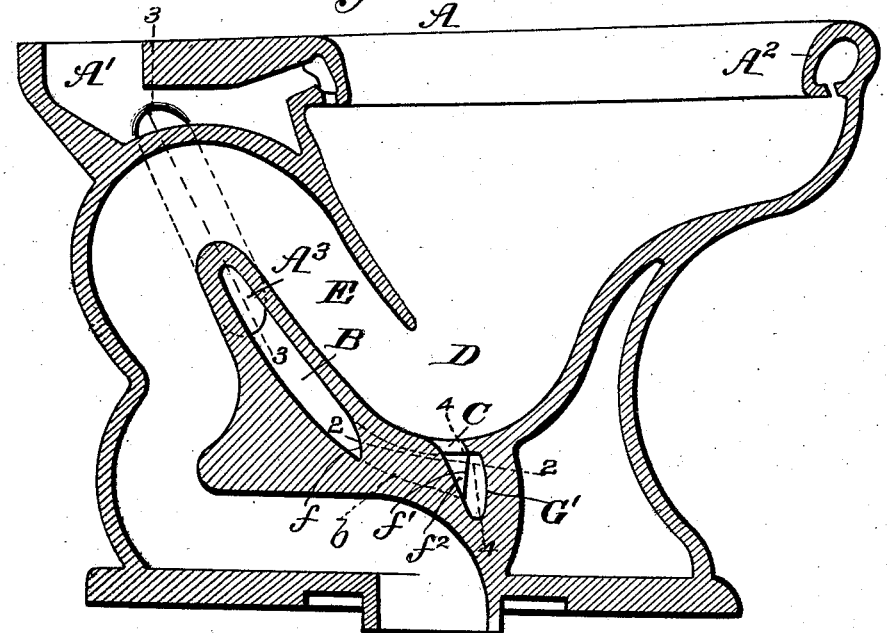
Figure 2:
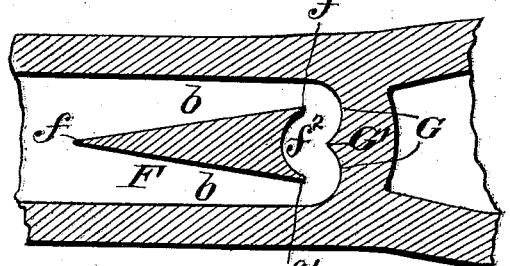
Figure 3:
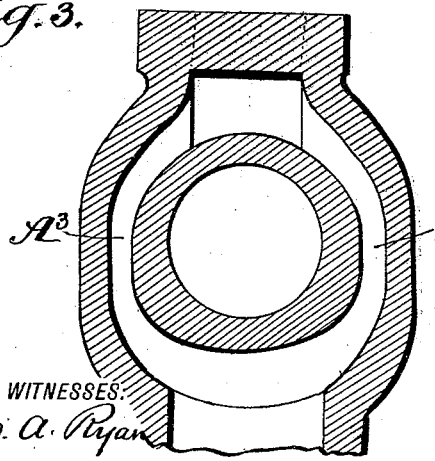
Figure 4:
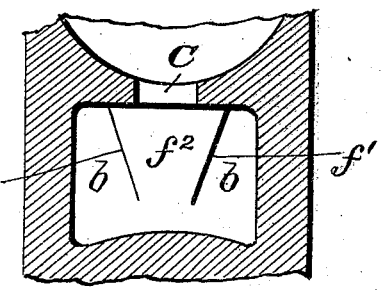

In the drawings, Figure 1 is a vertical longitudinal section of a bowl embodying my invention. Fig. 2 is a detail section on about line 2 2 of Fig. 1. Fig. 3 is a detail section on about line 3 3 of Fig. 1, and Fig. 4 is a detail section on about line 4 4 of Fig. 1.

My invention relates particularly to a novel construction of jet-pipe whereby to simplify the construction of the bowl and to avoid great loss in burning the bowls, which loss is caused by the complicated arrangement of the jet-pipes as ordinarily constructed and by the fire in burning the bowls cracking the small jet-pipes and causing leakage. By my invention I construct a jet-pipe that is unobstructed throughout most of its length and by which the entire tank-pressure operates on the jet-hole, and at the same time I avoid undue pressure upon the jet-hole as the water is filling the jet-pipe by dividing the water as it passes to the jet-hole and deflecting the water to the jet-hole, so it will be forced directly up the trap in such manner as to remove the contents of the bowl instantly and with great certainty.

In the construction shown the bowl A has the feed-opening A', the rim A², and the side channels A³ leading to the jet-pipe B, and the bowl A, so far as the parts A', A², and A³ are concerned, being of ordinary construction.

The jet-pipe B inclines downwardly and is provided near its lower end with the jet-hole C, leading up through the bottom of the well-hole or seal D and being directed toward the trap E in such manner as to deliver the jet directly up the said trap in the operation of the bowl, as presently described. In bowls in which the water passes down the jet-pipe B and into unobstructed contact with the jet-hole C the pressure of the water operates to cause considerable splashing of the water in the bowl and results in a noisy unsatisfactory operation, which I seek to avoid by relieving the jet-hole in a measure of the pressure of the water and divide the water delivered through the jet-pipe in advance of the jet-hole and deflecting the divided portions of such water and directing them to the jet-hole in such manner that they will not interfere with each other, but will be forced out the jet-hole in a strong steady stream directly up the trap.

In the construction shown I secure the desired results by the aid of a guard F, arranged in the jet-pipe in advance of the hole C and forming channels *b* at the opposite sides and being tapered toward its upper forward end practically to an edge *f* and widening thence toward its rear end, thus operating to divide the column of water passing down the jet-pipe and to cause the same to flow through the channels *b* and pass thence to the jet-hole C, being directed to the jet-hole by the concave deflecting-surface at the lower end of the jet-pipe. This concave deflecting-surface is preferably in the form of a double concave G, as shown in Fig. 2, the two concaves meeting in an upright edge G' below and in line with the jet-hole C, and also in line with a point midway between the opposite sides of the rear edge of the guard F, as will be understood from Figs. 1 and 2 of the drawings. The rear edge of the guard F inclines rearwardly from its upper to its lower side, as best shown in Fig. 1, and at the opposite sides of the guard I provide the rearwardly-projecting flanges or ribs *f'*, which aid in directing the water to the deflecting-surfaces G, whence it passes up through the curved channel $f^2$ in the rear side of the guard F, and thence through the jet-hole C, as desired.

In operation the jet will be so discharged as to avoid any splashing, and I am able to construct a jet-pipe of sufficient size to reseal the closet-bowl, and thereby do away with the costly, noisy, and otherwise objectionable resealing mechanism in the tank, and at the same time avoid any exposure of the jet-pipe at the sides of the bowl.

Having thus described my invention, what I claim as new, and desire to secure by Letters Patent, is—

1. A closet-bowl having an inlet, side channels leading thence, and a jet-pipe to which said side channels discharge, such jet-pipe being provided at its lower end a with a jet-hole, below the same with a double concave deflecting-surface and in advance of said jet-hole with a guard tapering to an edge at its front end and having its rear side inclining rearwardly from its upper toward its lower portion and provided in its rear end with an upright channel in line with the jet-hole, and also having the ribs or flanges at the opposite sides of said channel substantially as set forth.

2. A closet-bowl having a jet-pipe discharging at its lower end to a jet-hole and provided in advance of said jet-hole with a guard dividing the pipe into opposite side channels and having a deflecting-surface in rear of the jet-hole.

3. A closet-bowl having a jet-pipe discharging to a jet-hole and a guard in the pipe in advance of said jet-hole and dividing the pipe longitudinally into separate channels.

4. A closet-bowl having a jet-pipe leading to a jet-hole and a guard in the pipe in advance of said jet-hole and dividing the pipe into separate channels, the latter discharging in opposite directions toward each other and to the said jet-hole.

5. A closet-bowl having a trap, a jet-hole discharging in line with said trap and a jet-pipe leading to said jet-hole and a guard in the pipe in advance of the jet-hole and dividing it into separate channels discharging to said jet-hole.

6. A closet-bowl having a jet-pipe discharging to the jet-hole and provided in said jet-pipe in advance of the jet-hole with a wedge-shape guard dividing the pipe into separate channels.

7. A closet-bowl having a jet-pipe and a jet-hole to which said jet-pipe discharges, and provided in the jet-pipe in advance of the said hole with a wedge-shape guard and having a double concave deflector at the lower end of the jet-pipe and below the jet-hole.

8. A closet-bowl having a jet-hole and a jet-pipe having in advance of the jet-hole a guard in the form of a partition within the jet-pipe and provided at its lower end with the rearwardly-projecting edge ribs or flanges.

9. A closet-bowl having a jet-hole, a jet-pipe discharging to said hole and divided in advance of the hole into separate side channels and having at the lower rear end of the jet-pipe a double concave deflector with its sections meeting in a line midway between the opposite channels.

MICHAEL D. HELFRICH.

Witnesses:
SOLON C. KEMON,
PERRY B. TURPIN.